United States Patent [19]

Tietje

[11] 4,375,246
[45] Mar. 1, 1983

[54] GREASE LUBRICATING ASSEMBLY

[75] Inventor: Helmut G. Tietje, Woodcliff Lake, N.J.

[73] Assignee: TM Industries, Inc., Westwood, N.J.

[21] Appl. No.: 102,923

[22] Filed: Dec. 12, 1979

[51] Int. Cl.³ .................................... F16N 11/04
[52] U.S. Cl. ........................................... 184/45 R
[58] Field of Search .................. 184/45 R, 45 A; 222/386; 138/30, 31

[56] References Cited

U.S. PATENT DOCUMENTS

| | | | |
|---|---|---|---|
| 835,109 | 11/1906 | Jones et al. | 184/45 R |
| 1,234,635 | 7/1917 | Craven | 184/45 R |
| 1,234,636 | 7/1917 | Craven | 184/45 R |
| 1,685,404 | 9/1928 | Johnson | 184/45 R |
| 1,784,573 | 12/1930 | Butler et al. | 184/45 R |
| 1,793,108 | 2/1931 | MacIndoe | 184/45 R |
| 4,018,305 | 4/1977 | Tietje | 184/45 R |

FOREIGN PATENT DOCUMENTS 642276  2/1937  Fed. Rep. of Germany .... 184/45 R

*Primary Examiner*—David H. Brown
*Attorney, Agent, or Firm*—Louis E. Marn; Elliot M. Olstein

[57] ABSTRACT

There is disclosed an improved grease lubricating assembly comprised of a lubricating cup positioned within a housing and having a spring-loaded piston assembly formed with a lubricating cup contact assembly which abuts the inner side walls of the lubricating cup under variable controlled conditions of friction to compensate for or cancel out any unnecessary force of the compression spring before exerting the necessary force or pressure against the container grease to effect controlled grease flow.

13 Claims, 3 Drawing Figures

GREASE LUBRICATING ASSEMBLY

BACKGROUND OF THE INVENTION

This invention relates to grease lubricating assemblies, and more particularly to a grease lubricating assembly for metering a constant supply of grease to a lubrication site, such as a bearing assembly or the like, under pressure condition to minimize separation of the grease into its components.

Grease lubrication assemblies can generally be divided into two groups, the manual types in existance from the time of Liebing's patented unit in 1893, up to and including refined versions at the advent of World War II, and the post war type which are characterized by two important features, i.e. reservoir visibility and some form of automatic grease metering or flow control. Examples of such latter types are described in U.S. Pat. Nos. 3,498,413 and 4,018,305 to Krieger and Tietje, respectively.

The grease lubricating assemblies of both the Kreiger and Tietje references have transparent cups for grease level visibility, are operated by a compression spring and have a metering system for controlling the rate of grease flow. The Tietje assembly was an improvement over the Kreiger assembly in that operation was based on a different metering principle and was generally considered to do a more effective job over a wider range of greases and environmental factors.

Both of such grease lubricating assemblies, however, exhibited many shortcomings. For example, the ratio of grease volume to overall assembly volume was too low for efficient space utilization. The assemblies required different strength compression springs for different weight greases. All such assemblies placed excessive forces, i.e. a force higher than necessary on the contained grease to thereby result in "oil-separation."

Such unit metering lubricating grease assemblies were provided with a spring having a spring force necessary to expel the grease from the reservoir. Since the minimum spring force must be maintained throughout the entire delivery cycle (from full to empty) the spring must, of necessity, be chosen which is still able to deliver such necessary force in an extended position (empty). This means that the spring will deliver approximately twice the required force in a compressed position (full). Of course, the variation in flow rate caused by the difference in spring force is essentially converted into a constant flow rate by the metering mechanisms, e.g. variable restriction type, built into such assemblies.

While solving the flow rate problem, the problem of such assemblies were the excessive force acting on the contained grease in the compressed mode (full). Grease is basically oil suspended in a matrix of additives which impart a variety of charateristics such as film retention, temperature range stability, extension resistance, etc. Industry has strived over the years to improve such grease qualities. One of the most important characteristics, however, is the ability to resist "oil-separation." Oil separation is caused by pressure over a period of time. The rate of separation caused by a given level of pressure may be increased or decreased by temperature changes, but, sustained pressure is deleterious. Therefore, any sustained pressure caused by spring force beyond the level required to move the grease to the bearing is excessive and undesirable, and increases the tendency of "oil-separation."

OBJECTS OF THE PRESENT INVENTION

It is a object of the present invention to provide an improved grease lubricating assembly.

Another object of the present invention is to provide an improved grease lubricating assembly which exerts a constant spring force of a quantum necessary for grease flow throughout a delivery cycle.

Still another object of the present invention is to provide an improved grease lubricating assembly which does not exert an unnecessary force at any stage of the delivery cycle.

A still further object of the present invention is to provide an improved grease lubricating assembly which substantially eliminates the problem of oil separation.

A further object of the present invention is to provide an improved grease lubricating assembly which employes a spring of a given spring compression for diverse grease flow rates with diverse grease viscosities (weights).

Still another object of the present invention is to provide an improved grease lubricating assembly having a large grease column to over all height ratio.

SUMMARY OF THE INVENTION

These and other objects of the invention are achieved by providing a grease lubricating assembly comprised of a lubricating cup positioned within a housing and having a springloaded piston assembly formed with a lubricating cup contact assembly which abuts the inner side walls of the lubricating cup under variable controlled conditions of friction to compensate or cancel out any unnecessary force of the compression spring before exerting the necessary force or pressure against the contained grease to effect controlled grease flow. Thus, the assembly of the present invention cancels out the excess or unnecessary force before being transmitted to the grease in contrast to the grease lubricating assemblies of the prior art which cancel out the unnecessary or excess force after such force has been transmitted through the grease.

BRIEF DESCRIPTION OF THE DRAWINGS

Further objects and advantages of the invention will become apparent upon consideration of the detailed disclosure thereof, especially when taken with the accompanying drawings, wherein like numerals designate like parts throughout, and wherein.

DETAILED DESCRIPTION OF THE INVENTION

Figure 1:
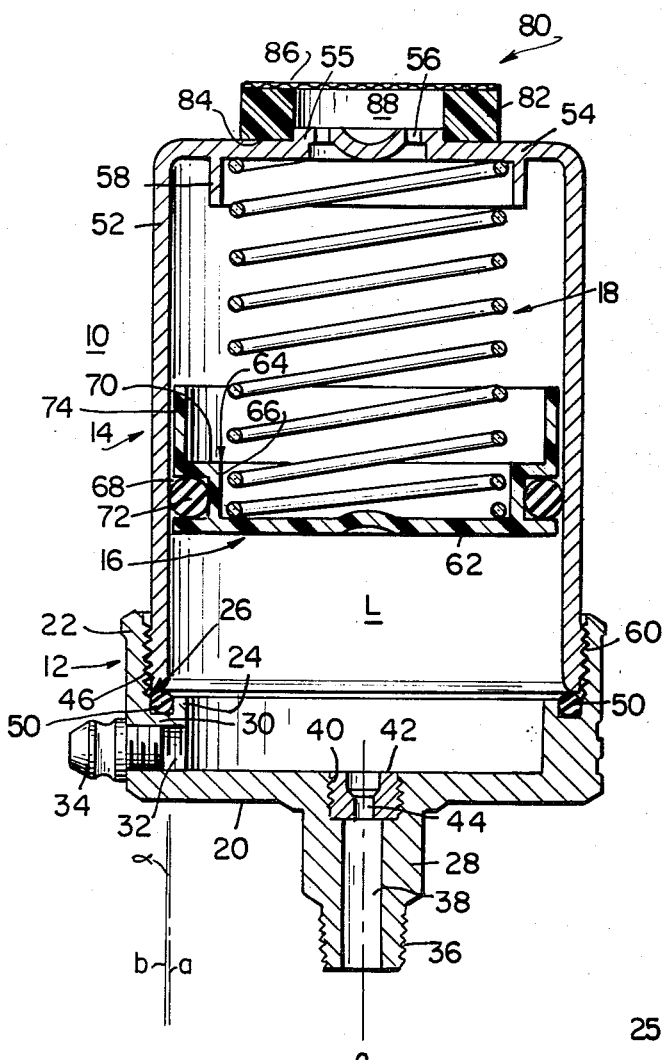
FIG. 1 is a sectional front elevational view of the grease lubricating assembly of the present invention in a partial lubricant filled mode.

Referring to the drawing and in particular FIG. 1 of a preferred embodiment thereof, there is illustrated a grease lubricating assembly, generally indicated as 10, comprised of a cylindrically-shaped housing 12, a cylindrically-shaped cup 14, a piston assembly 16 and a coil spring 18. The housing 12 is comprised of a disc-shaped base portion 20 with a cylindrically-shaped outer wall 22 formed about the terminal portion of the base portion 20 and concentrically disposed cylindrically-shaped inner wall section 24 forming a cylindrically-shaped gasket channel 26. On a side of the base portion 20 of the housing 12 opposite the walls 22, there is formed a tubularly-shaped lower wall section 28 in coaxial alignment with the housing 12. A portion of the base portion 20 and the outer wall 24 is formed with a lubricant resupply portion 30 including a threaded chamber 32 in which is threaded a conventional type lubricant fitting 34.

The exterior lower surface of the lower wall section 28 is provided with an externally threaded section 36 to permit mounting of the assembly 10 to a machine (not shown) to be lubricated. The lower wall section 28 is formed with an interior cylindrical-shaped passageway 38 having an upper end portion of enlarged cross-section provided with a threaded wall 40. A threaded fitting 42 having an orifice 44 of preselect cross-sectional area is threaded into the enlarged end portion of the passageway 38. Fitting having orifices of varying cross-sectional areas may be used as more fully hereinafter discussed. The interior surface of the outer wall 22 of the housing 12 is provided with internal threads 46 below which there is disposed a seal ring 50 in the gasket channel 26.

The cup 14 is formed of a generally cylindrically-shaped side wall 52 enclosed at one end by an end wall 54 having an upwardly extending centrally-disposed end portion 55 having orifices 56 and an inwardly and downwardly extending cylindrically-shaped internal wall section 58. The side wall is slightly tapered at an angle α outwardly from top to bottom (as defined by line a corresponding to the axis of the housing 12 and by line b parallel to the inner surface of the side wall 52), the degree of tapering being not less than 0.1 degree and not more than 2.5 degrees throughout the travel distance of the cup 16. The internal wall section 58 of the cup 14 is spaced from the side wall 52 to permit the piston assembly 16 to extend to the end wall 54.

The orifices 56 permit the evacuation of air within the upper portion of the assembly 10 during lubricant refilling thereof. The lower outer surface of the side wall 52 is formed with a threaded portion 60 for threaded engagement with the threaded portion 46 of the housing 12 whereby the lower edge of the cup 14 is forced against the seal rings 50 positioned within the channel 26. The seal ring 50 is compressed to the extent necessary to prevent the leakage of grease contained within the cup 14.

The piston 16 is formed of a disc-shaped base portion 62 disposed in a plane substantially perpendicular to the axis of the housing 12 and an upwardly extending side wall portion, generally indicated as 64. The side wall portion 64 is formed of an inner cylindrically-shaped side wall section 66 extending upwardly from the base portion 62 a given distance from the inner surface of the side wall 52 of the cup 14 and defining a gasket channel 68 with a horizontally disposed disc-shaped intermediate wall section 70 extending outwardly from a top portion of the inner side wall section 66. A piston seal gasket 72 is disposed within the gasket channel 68 and formed of a suitable elastomeric material, as more fully hereinafter discussed. Extending upwardly from an outer end portion of the intermediate wall section 70 there is formed a cylindrically-shaped upper outer side wall section 74 substantially parallel to the axis of the housing 12. The outer side wall portion 74 serves as a guide for the piston member 16 during displacement to maintain it's axis of travel parallel to axis of the cup 14.

By inducing a progressively greater squeeze on the seal gasket 72 as the piston 16 is raised within the cup 14, i.e. the piston 16 being raised upwardly against the tapered inner surface of the side wall 52 of the cup 14, an increasing amount of frictional resistance is generated which is proportional to the hereinabove discussed unnecessary force and thereby cancels such unnecessary force thereby effecting a spring force no greater than is necessary for controlled grease or lubricant flow. The piston has a diameter not less than 0.750" and not greater than 4.00", and for non-circular shapes, the projected surface area in contact with the grease should not be less than 0.420 nor more than 12.60 square inches.

The seal gasket 72 is formed of a suitable elastomeric gasket material such as neoprene, buna N, silicone rubber, polyurethane and the like. The piston seal gasket 72 is of a cross-sectional area and having a range of softness of 40 to 80 durometer as measured on the Shore A scale which permits a range of friction in cooperation with the inner surface of the side wall 52 of the cup 14 wherein the cross-sectional diameter of the seal gasket 72 is distorted not less than 2% no more than 38% of its cross-sectional diameter by the squeezing action.

The coil spring 18 disposed within the assembly 10 is dimensioned with one end portion being positioned within the inner wall section 58 of the cup 14 with the other end portion thereof being disposed within the inner side wall section 66 of the piston 16. The spring 18 is selected to be of a fixed compressional force regardless of flow requirements or viscosity (weight) of the grease. The spring 18 provides the means for effecting lubricant flow from the lubricant reservoir "L" to the lubricant supply orifice 38 via the passageway 44 of the fitting 42.

The compression force of the spring 18 is selected such that there is not less than 1.20 lbs. nor more than 6.2 lbs. of force per square inch of projected piston area acting on the grease at the interface between the piston surface and the grease. Such force must be within such range throughout the entire piston and spring travel distance.

Desired lubricant or grease flow is achieved by varying the orifice size 44 of the fitting 42. Thus, the user may adjust the flow of the grease lubricating assembly 10 in accordance with lubricant requirements of the machinery being lubricated for any given viscosity (weight) of the lubricant. Under certain conditions, the fitting 42 may be eliminated with the passageway 38 acting as the lubricating orifice. The orifice size for a cylindrically-shaped orifice should not be less than 0.045 inches nor greater than 0.380 inches, with orifice sizes of other shapes having a cross-sectional area of not less than 0.002 square inch and not more than 0.120 square inch with a smallest distance across of not less than 0.018 inches.

A filter or cover means, generally indicated as 80, is provided and is comprised of a disc-shaped body 82 of an expanded microcellular open cell foam material and having a pressure sensitive coating 84 to enable the body 82 to be attached to the end portion 55 of the top wall 54. On a side opposite the pressure sensitive coating 84, there is provided a paper or foil backing layer 86 to prevent loading of the foam cells with settling particulate matter. The filter means 80 forms a plenum chamber 88 between the underside of the central part of the body 82 and the top part of the end portion 55. The plenum chamber 88 allows air to travel through all parts of the filter not in direct contact with the end portion 55 thereby significantly increasing its air flow rate capability and effective life before becoming clogged with particulate matter, as compared to a configuration in which the underside of the filter means were to come in direct contact with the upper end of the breather holes.

In operation, a high pressure lubricant injector or gun (not shown) is suitably positioned on the fitting 34 and lubricant introduced via the orifices 32 into the lubricant reservoir "L" formed by the base 20 of the housing 12, the interior surface of the side wall 52 of the cup 14 and the lower surface of the base 62 of the piston member 16 until the piston member 16 is caused to rest on a portion of the end wall 54. Generally, the lubricant assembly 10 is affixed to the machine to be lubricated after filling the lubricant reservoir "L". Upon removal of the lubricant gun, the compressional force of the spring 20 as balanced by the frictional resistance generated between the seal gasket 72 and the inner surface of the side wall 52 of the cup 14 results in downward movement of the piston 16 within the cup 14 and housing 12. Controlled lubricant or grease flow is maintained throughout the delivery mode at a force requirement sufficient to effect lubricant flow while simultaneously cancelling out any unnecessary force by reducing frictional resistance at constantly reducing spring compressional forces throughout the travel of the piston 16 within the assembly 10.

Figure 2:
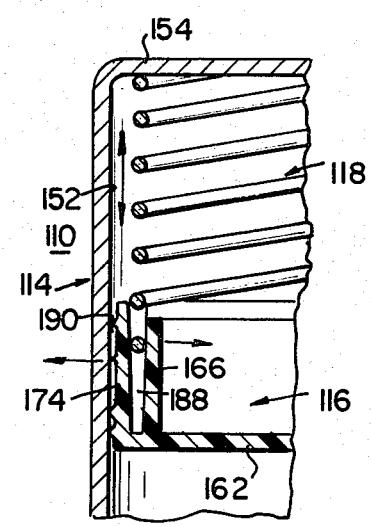
FIG. 2 is a partial, sectional front elevational view of another embodiment of the present invention.

Referring now to FIG. 2, there is illustrated another embodiment of the present invention wherein frictional resistance between the cup 114 and the piston 116 is achieved by a different structural configuration. In the embodiment, there is provided a tapered annular groove 188 formed by an outer side wall 174 and an intermediate wall 166 of the piston 116 formed of an elastomeric material. The interior surface of the side wall 152 of the cup 114 is tapered similar to the cup 14 of FIG. 1. In accordance with the embodiment of FIG. 2, a lateral annular force is generated by utilizing the downward force of the compression spring 118 and having the lower portion thereof positioned in the tapered annular groove 188 whereby the downward force of the spring 118 transmits a force to the grease under the piston 116 as well as to tend to drive the tapered side walls 166 and 174 apart. This "driving apart" action will force the outer wall 174 against the interior surface of the reservoir cup 114, thereby increasing frictional resistance. The selection of the elastomeric material, the taper angle of the annular groove and the changing spring force provides the desired frictional resistance.

Figure 3:
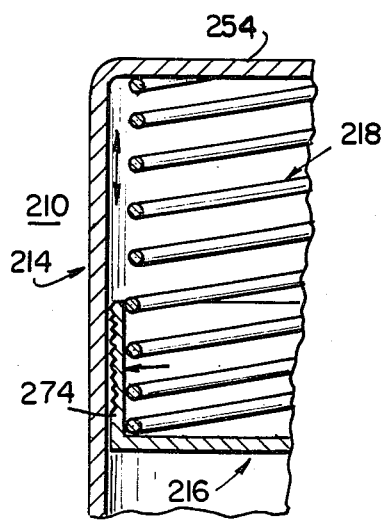
FIG. 3 is a partial, sectional front elevational view of still another embodiment of the present invention.

In the embodiment of FIG. 3, the same frictional resistance is accomplished by creating a like annular lateral force directly from the spring 18. A spring 18 is disposed within the piston 116 and has a like outside diameter (in a rest position) as the inner diameter of the inner surface portion of the side wall 274 of the piston 216. Since the diameter of a coil spring slightly increases as the spring is compressed, compression of the spring 216 exerts an annular lateral force against the inner surface of the side wall 252 of the cup 114 via the side wall 274 by virtue of such increasing diameter.

The following features are achieved by the grease lubricating assembly of the present invention:

1. A minimal overall unit height which is in a range of being not more than two times the height of the filled grease column.
2. A dispensing grease volume which is at least 80% of the contained grease volume.
3. A reservoir configuration devoid of any crevices or depression in which grease can be trapped.
4. An arrangement of parts which permit the removal of all components from the base without requiring the base to be removed from the equipment or bearing housing.
5. An arrangement in which the reservoir, the piston and the compression spring can operate effectively throughout the entire piston travel range without allocating additional vertical space for the stacking height of the spring in a fully compressed state. The spring stack height is fully accomodated within the height of the piston sidewall.
6. A compression spring in a cylindrical coil configuration having sufficient extension capacity and force to produce a relatively flat force curve, the force curve from such to provide a force in the full or compressed position not more than twice the force exerted in the empty or extended position.
7. One or more fittings with different orifice diameters which, when selectively inserted in the interior portion of the unit base orifice will modify the grease flow rate produced by the pressure exerted by the compression spring to the desired flow rate as dependent on grease viscosity (weight).
8. A grease metering system to compensate for changing spring forces during the travel phase in which the coefficient of friction between the piston (or piston seal) and the inside wall surface of the reservoir changes proportional to the reduction in force exerted by the compression spring as the same becomes extended.

Numerous modifications and variations of the invention are possible in light of the above teachings and therefore the invention may be practiced otherwise than as particularly described.

I claim:

1. A grease lubricating assembly for supplying a substantially constant flow of lubricant to an apparatus to be lubricated which comprises:

a housing member formed by a base portion including an orifice, an upper side wall portion extending upwardly from said base portion and a lower wall portion defining a lubricant passageway extending downwardly from said base portion, said base portion being formed with a substantially flat top wall, said orifice being in lubricant communication with said lubricant passageway of said lower wall portion and of a larger cross-sectional area than said lubricant passageway, said orifice being formed for recieving a changeable fitting, said flat top wall of said base portion of said housing member being formed with an upwardly-extending inner section forming a channel with said upper side wall portion, said upper side wall portion having a threaded inner surface;

a fitting having a lubricating channel disposed in said orifice of said housing member;

a lubricant container comprised of an end wall and side wall positioned within and mounted to said housing member, said side wall of said lubricant container formed with a tapered inner surface of decreasing diameter from bottom to top and at an angle of from 0.1 to 2.5 degrees throughout the side wall length with respect to the axis of said housing member, said lubricant container having at least one orifice about said end wall, said side wall being provided with threaded means for mounting within said housing member;

a sealing ring compressively disposed in said channel of said housing member between said base portion and a terminal portion of said side wall of said lubricant container;

a piston including peripheral seal means wholly positioned in said housing member and disposed in a manner whereby said peripheral seal means contacts said tapered inner surface of said side wall of said lubricant container, said peripheral seal means of said lubricant container being formed of an elastomeric material for contacting said tapered inner surface of said side wall of said lubricant container with increasing contact area therebetween with concommital increase in frictional resistance as said pistron is inserted into said lubricant container, said piston being formed with a substantially flat bottom wall which cooperates with the said flat top wall of said base portion of said housing member thereby minimizing the amount of lubricant remaining in said grease lubricating assembly upon completion of travel of said piston within said lubricant container, said piston traveling a distance greater than 50 percent of the overall height of said grease lubricating assembly; and a coil spring disposed within said lubricant container between said end wall thereof and said piston, said coil spring having decreasing compressional force compensated by a decrease in said frictional resistance between said seal means and said tapered inner surface of said side wall of said lubricant container to permit substantially constant flow of lubricant.

2. The grease lubricating assembly as defined in claim 1 wherein said piston has a contact surface with grease in said container of from 0.420 to 12.60 square inches.

3. The grease lubricating assembly as defined in claim 1 wherein said spring has a compressional force between 1.20 and 6.2 pounds of force per square inch of piston area.

4. The grease lubricating assembly as defined in claim 1 and including an expanded microcellular open foam body overlying said orifice of said end wall of said container to minimize the entry of particulate material into said container during lubricant delivery.

5. The grease lubricating assembly as defined in claim 1 wherein said peripheral seal means is formed of an elastomeric seal ring disposed in a peripherally-shaped channel formed in said piston whereby said elastomeric seal ring contacts said interior surface of said side wall of said container at variable controlled conditions of friction.

6. The grease lubricating assembly as defined in claim 1 wherein peripheral seal means of said piston is formed of an outer side wall and an intermediate side wall, said outer side wall contacting said side wall of said container, said outer side wall and said intermediate side wall forming a tapered groove for receiving an end portion of said coil spring thereby to vary separation of said groove whereby said outer side wall of said piston contacts said interior surface of said side wall of said container at variable controlled conditions of friction.

7. The grease lubricating assembly as defined in claim 1 wherein said peripheral seal means of said piston is formed by a side wall of said piston contacting said interior surface of said side wall of said container, said side wall having an interior surface dimensioned to a like diameter as said coil spring at rest whereby compression of said coil spring exerts a lateral force on said wall against said interior surface of said side wall of said container and thereby contact said interior surface of said side wall of said container at variable controlled conditions of friction.

8. The grease lubricating assembly as defined in claim 1 wherein said housing member, said lubricant chamber and said piston are cylindrically-shaped.

9. The grease lubricating assembly as defined in claim 8 wherein said piston has a diameter of from 0.750 to 4.00 inches.

10. The grease lubricating assembly as defined in claim 8 and including fittings of varying lubricant orifice size.

11. The grease lubricating assembly as defined in claim 10 wherein said lubricant orifice size varies from 0.045 to 0.380 square inches.

12. The grease lubricating assembly as defined in claim 8 and including an expanded microcellular open foam body overlying said orifice of said end wall of said container to minimize the entry of particulate material into said container during lubricant delivery.

13. The grease lubricating assembly as defined in claim 12 wherein said expanded microcellular open foam body is provided with a backing sheet and forms a chamber with said end wall of said chamber and is mounted to said end wall by a pressure sensitive material.

* * * * *

UNITED STATES PATENT AND TRADEMARK OFFICE
CERTIFICATE OF CORRECTION

PATENT NO. : 4,375,246

DATED : MARCH 1, 1983

INVENTOR(S) : HELMUT G. TIETJE

Figure 4:
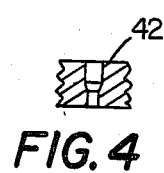

It is certified that error appears in the above-identified patent and that said Letters Patent is hereby corrected as shown below:

Col. 2, line 53, delete "and";
line 55, after "invention", delete "." and add -- ; and --;

Add the following:
-- FIG. 4 is an elevational view of a fitting of smaller lubricant orifice. --

Signed and Sealed this

Sixth Day of March 1984

[SEAL]

Attest:

GERALD J. MOSSINGHOFF

Attesting Officer

Commissioner of Patents and Trademarks